United States Patent [19]

Kawase et al.

[11] Patent Number: 5,584,011
[45] Date of Patent: Dec. 10, 1996

[54] MULTIPROCESSOR SYSTEM WITH PARALLEL EXECUTION OF DATA

[75] Inventors: Kei Kawase, Komaea; Takao Moriyama, Yokohama, both of Japan

[73] Assignee: International Business Machines Corporation, Armonk, N.Y.

[21] Appl. No.: 372,614

[22] Filed: Jan. 13, 1995

[30] Foreign Application Priority Data

Jan. 19, 1994 [JP] Japan ..................... 6-004040

[51] Int. Cl.⁶ .................... G06F 12/02; G06F 13/00
[52] U.S. Cl. .................... 395/445; 395/473; 364/DIG. 1; 364/DIG.2; 364/243.41
[58] Field of Search .................... 395/427, 473, 395/472, 445, 451, 468; 364/230, 243.4, 243.41, DIG. 1, DIG. 2

[56] References Cited

U.S. PATENT DOCUMENTS

| | | | |
|---|---|---|---|
| 4,622,631 | 11/1986 | Frank et al. | 395/800 |
| 4,719,568 | 1/1988 | Carrubba et al. | 395/450 |
| 4,939,641 | 7/1990 | Schwartz et al. | 395/473 |
| 4,959,777 | 9/1990 | Holman, Jr. | 395/468 |
| 5,058,006 | 10/1991 | Durdan | 395/449 |
| 5,148,526 | 9/1992 | Nishimukai et al. | 395/872 |
| 5,182,797 | 1/1993 | Liang et al. | 395/160 |
| 5,263,144 | 11/1993 | Zurawski et al. | 395/448 |
| 5,283,886 | 2/1994 | Nishii et al. | 395/471 |
| 5,319,766 | 6/1994 | Thaller et al. | 395/458 |
| 5,319,768 | 6/1994 | Rastegar | 395/473 |
| 5,404,483 | 4/1995 | Stamm et al. | 395/471 |
| 5,423,016 | 6/1995 | Tsuchiya et al. | 395/450 |
| 5,428,761 | 6/1995 | Herlihy et al. | 395/457 |
| 5,509,133 | 4/1996 | Nishimukai et al. | 394/440 |

OTHER PUBLICATIONS

"Execution Performance Evaluation on Multiprocessor of Geometry Operation for the Processing Structure of PHIGS" by Takashi Matusmoto et al, Parallel Processing Symposium JSPP '92, pp. 375–382.

Primary Examiner—Tod R. Swann
Assistant Examiner—Tuan V. Thai
Attorney, Agent, or Firm—Mark E. McBurney; Richard A. Henkler

[57] ABSTRACT

Data sets of sequential data strings at a particular point in time are assigned to processing elements of a multiprocessor system at high speed and processing is executed efficiently in parallel. A mechanism for preventing allocation due to all-read to a cache block which has not yet been referred from another cache is added by providing a reference bit with respect to cache blocks. The reference bit becomes 0 when new data is read to the cache block and becomes 1 when the cache block is referenced by a CPU. In the case of reading data from another cache, if a block corresponding thereto can be replaced without the need to be written back to the other cache and the reference bit is 1, data is fetched to the shared cache memory.

1 Claim, 7 Drawing Sheets

|   | PE0 |     |   | PE1 |     |
|---|-----|-----|---|-----|-----|
| 0 | 000 | 008 | 0 | 000 | 008 |
| 1 | 001 | 009 | 1 | 001 | 009 |
| 2 | 002 | 00a | 2 | 002 | 00a |
| 3 | 003 | 00b | 3 | 003 | 00b |
| 4 | 004 | 00c | 4 | 004 | 00c |
| 5 | 005 | 00d | 5 | 005 | 00d |
| 6 | 006 | 00e | 6 | 006 | 00e |
| 7 | 007 | 00f | 7 | 007 | 00f |

Bus access 3     Bus access 0

FIG. 3

|   | PE0 |     |   | PE1 |     |
|---|-----|-----|---|-----|-----|
| 0 | 010 | 008 | 0 | 010 | 008 |
| 1 | 011 | 009 | 1 | 011 | 009 |
| 2 | 012 | 00a | 2 | 012 | 00a |
| 3 | 013 | 00b | 3 | 013 | 00b |
| 4 | 004 | 00c | 4 | 004 | 00c |
| 5 | 005 | 00d | 5 | 005 | 00d |
| 6 | 006 | 00e | 6 | 006 | 00e |
| 7 | 007 | 00f | 7 | 007 | 00f |

Bus access 4     Bus access 0

FIG. 4

|   | PE0 |     |
|---|-----|-----|
| 0 | 011 | 008 |
| 1 | 011 | 009 |
| 2 | 012 | 002 |
| 3 | 013 | 00b |
| 4 | 004 | 00c |
| 5 | 005 | 00d |
| 6 | 006 | 00e |
| 7 | 007 | 00f |

Bus access 0

|   | PE1 |     |
|---|-----|-----|
| 0 | 011 | 008 |
| 1 | 011 | 009 |
| 2 | 012 | 002 |
| 3 | 013 | 00b |
| 4 | 004 | 00c |
| 5 | 005 | 00d |
| 6 | 006 | 00e |
| 7 | 007 | 00f |

Bus access 1

FIG. 5

|   | PE0 |     |
|---|-----|-----|
| 0 | 010 | 018 |
| 1 | 011 | 019 |
| 2 | 01a | 002 |
| 3 | 013 | 01b |
| 4 | 014 | 01c |
| 5 | 015 | 01d |
| 6 | 016 | 00e |
| 7 | 017 | 00f |

Bus access 10

|   | PE1 |     |
|---|-----|-----|
| 0 | 010 | 018 |
| 1 | 011 | 019 |
| 2 | 01a | 002 |
| 3 | 003 | 01b |
| 4 | 004 | 01c |
| 5 | 015 | 01d |
| 6 | 016 | 00e |
| 7 | 017 | 00f |

Bus access 2

| | | |
|---|---|---|
| 0 | 010 | 018 |
| 1 | 011 | 019 |
| 2 | 01a | 002 |
| 3 | 003 | 01b |
| 4 | 004 | 01c |
| 5 | 005 | 01d |
| 6 | 006 | 01e |
| 7 | 007 | 01f |

Bus access 2

PE1

| | | |
|---|---|---|
| 0 | 010 | 018 |
| 1 | 011 | 019 |
| 2 | 01a | 002 |
| 3 | 003 | 01b |
| 4 | 004 | 01c |
| 5 | 005 | 01d |
| 6 | 006 | 01e |
| 7 | 007 | 01f |

Bus access 2

| | | |
|---|---|---|
| 0 | 008 | 018 |
| 1 | 009 | 019 |
| 2 | 00a | 002 |
| 3 | 00b | 00b |
| 4 | 004 | 00c |
| 5 | 005 | 00d |
| 6 | 006 | 00e |
| 7 | 007 | 00f |

Bus access 0

PE1

| | | |
|---|---|---|
| 0 | 008 | 018 |
| 1 | 009 | 019 |
| 2 | 00a | 002 |
| 3 | 00b | 01b |
| 4 | 004 | 00c |
| 5 | 005 | 00d |
| 6 | 006 | 00e |
| 7 | 007 | 00f |

Bus access 8

PE0

| 0 | 008 | 010 |
| 1 | 009 | 011 |
| 2 | 00a | 012 |
| 3 | 00b | 013 |
| 4 | 014 | 00c |
| 5 | 015 | 00d |
| 6 | 016 | 00e |
| 7 | 017 | 00f |

Bus access 2

PE1

| 0 | 008 | 010 |
| 1 | 009 | 011 |
| 2 | 00a | 012 |
| 3 | 00b | 013 |
| 4 | 014 | 00c |
| 5 | 015 | 00d |
| 6 | 016 | 00e |
| 7 | 017 | 00f |

Bus access 8

MULTIPROCESSOR SYSTEM WITH PARALLEL EXECUTION OF DATA

BACKGROUND

1. Field of the Present Invention

The present invention generally relates to graphic display systems, and more particularly, to multi-processor graphic display systems.

2. History of Related Art

In a three-dimensional graphic display system (interface), such as that defined by PHIGS (Programmer's Hierarchical Interactive Graphics System) or the like, data is received by the system in the form of a structure. This structure is evaluated at the time of drawing so that a string of drawing instructions is generated therefrom. This string of drawing instructions is composed of attributes and primitives. Attributes are stored in a TSL (Traverse State List) as attribute items. During a draw operation on a computer display, primitives use the attributes in the TSL. In the case where these operations are to be performed in parallel by a multiprocessor system, a processing element (processor) is assigned a primitive so that execution can be achieved with high efficiency. In this case, each processing element to which a primitive is assigned must contain a copy of the contents of the TSL when the primitive is assigned thereto. To do so, the processing element must copy the TSL at the time of assignment to its private region each time the primitive is processed. Since the capacity of the TSL is generally 1000 bytes or more, overhead increases by virtue of the increase in the traffic on the bus, and the like. Therefore, the advantage of multiprocessor-based high-speed processing deteriorates.

A method is needed not only for copying the TSL when the primitive is assigned to a processing element, but also a method wherein the respective processing elements independently interpret and execute the primitives. This is called a symmetry system. (The symmetry system is introduced in "Execution performance evaluation on multiprocessor of geometry operation for the processing structure of PHIGS" by Takashi Matsumoto, Kei Kawase, and Takao Moriyama: Parallel processing symposium JSPP'92, p. 375–382).

SUMMARY OF THE INVENTION

An object of the present invention is to provide a shared bus and shared-memory type multiprocessor in which datasets of sequential data strings in a time point are assigned to processing elements at high speed and processing can be efficiently executed in parallel. To solve the above problem, according to the present invention, a mechanism for preventing allocation due to an all-read operation to a cache block which has not yet been referred by another cache is added by providing a reference bit operative with respect to the cache blocks. This protocol will be referred as the weak-all-read protocol hereafter. In the case of weak-all-read protocol packaging, hardware need only add a reference bit and a controller for this bit to the conventional all-read protocol. The reference bit and a significant bit (this is also necessary in the case of all-read) are used in common so that hardware is not increased. However, in this case, the limitation to software is increased.

The reference bit becomes 0 when new data is read in the cache block, and becomes 1 when the cache block is referred by a CPU. Basic operation is the same as that of the all-read protocol. When data of another cache is read, and if a block corresponding thereto need not be written back to the cache and can be replaced and the reference bit is 1, then data is provided to the shared cache. The replacement of the block itself due to access by the CPU shall be executed even when the reference bit is 0.

Other objects, features and advantages of the present invention will become apparent from the previous summary when taken in conjunction with the subsequent description, drawings and the appended claims.

DETAILED DESCRIPTION OF THE PREFERRED EMBODIMENTS

In the case where processing is in accordance with the symmetry system, an all-read protocol is employed for a snoop cache protocol so that high-speed processing can be achieved. This is disclosed in PUPA 2-238543.

The above method is carried out in such a manner that the snoop protocol is set to all-read with respect to sections (structure headers or an indication to set attributes) which all processing elements (PEs) must read in the region of an area CSS (Central Structure Store) to store a structure, and when a certain processing element reads this data via a shared bus, as much data as possible is fetched (provided) to the cache of other processing elements which snoop the bus. Thus, when other processing elements try to read the same data thereafter for traverse, it is expected that the data has been already cached, and access to the shared bus is reduced, so that it can be anticipated that processing is executed at high speed. This state is shown in FIG. 1.

Figure 1:
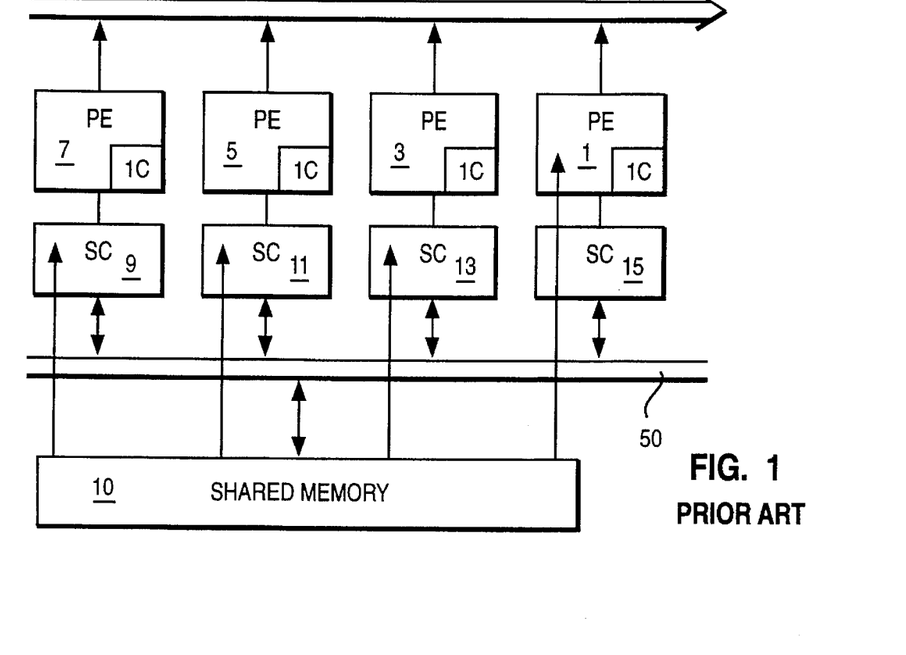
FIG. 1 is a block diagram showing a conventional construction.

FIG. 1 shows the state that data read by a processing element 1, located at the right end from shared memory 10 is fetched by other snoop caches 9, 11, 13 and 15 via bus 50. However, this symmetry system using all-read protocol is effective only when the respective processing elements read (traverse) substantially the same section of CSS within a prescribed time. When the number of processing elements 1, 3, 5, 7 increases, or when the processing time of primitives is extremely uneven, forced allocation due to all-read is generated, irrespective of the size of cache, and data to be stored is replaced. This phenomenon is referred as overrun herein for explanation. When overrun arises, an unnecessary replace is generated so that traffic on the shared bus is increased and the processing speed is lowered.

Overrun is described in the following text. Herein, to simplify the explanation, it is assumed that the number of PEs is 2, and the size of the cache is 16-word two-way set-associative (the actual size of the cache is larger). If a cache miss occurs, each word is read for one transfer via bus from shared memory. A cache block is replaced based on an LRU (Least Recently Used) method.

Figure 2:
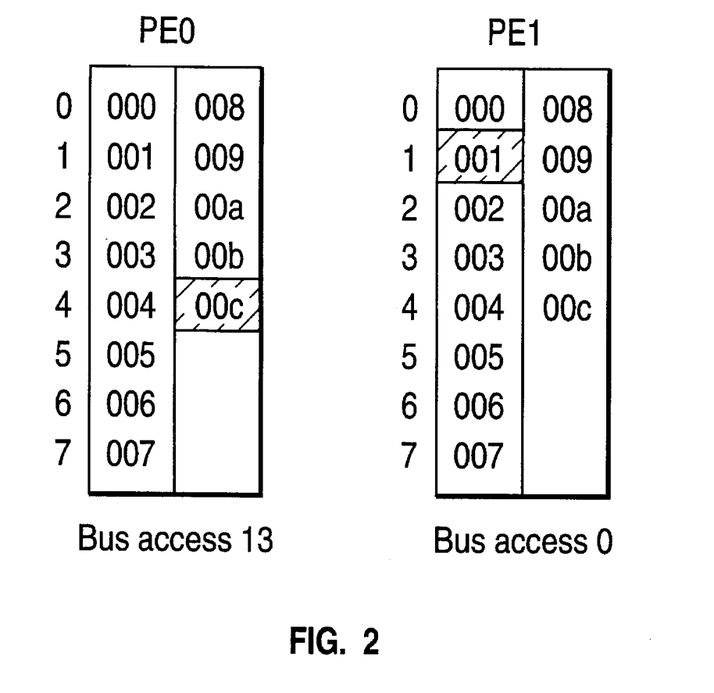
FIG. 2 is a table to for explaining the operation of the present invention.
Figure 3:
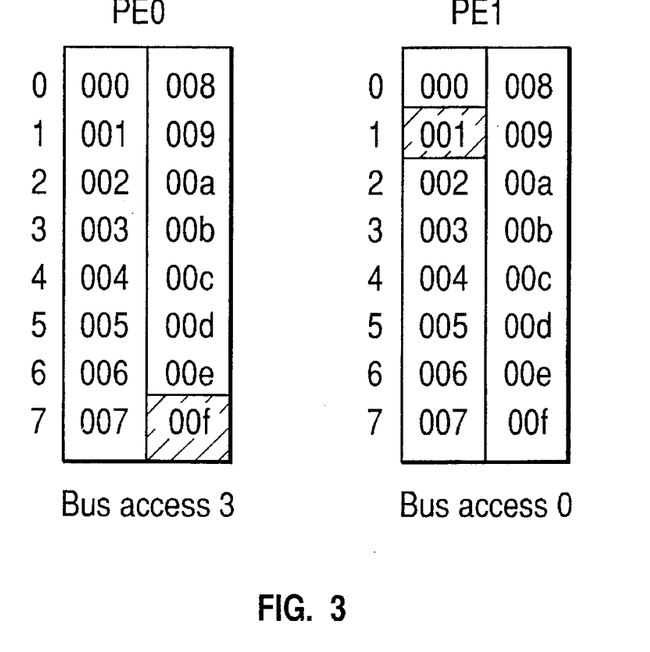
FIG. 3 is table for explaining the operation of the present invention.

It is now assumed that two PEs, that is, PE0 and PE1, do a traverse. In the traverse, reading is to be sequential, word by word, from address 000 in ascending order of addresses. The traverse may be halted in progress for a predetermined time for the purpose of processing the primitives. Stop locations and stop times differ depending on the PE. FIG. 2 indicates states where PE0 reads addresses 000 to 00c and PE1 reads addresses 000 to 001. The all-read protocol of the snoop cache operates effectively and the number of transfers of the bus may be 13. FIG. 3 shows the state where PE0 reads addresses 000 to 00f. Cache blocks are all filled, then replaced for data access thereafter.

Figure 4:
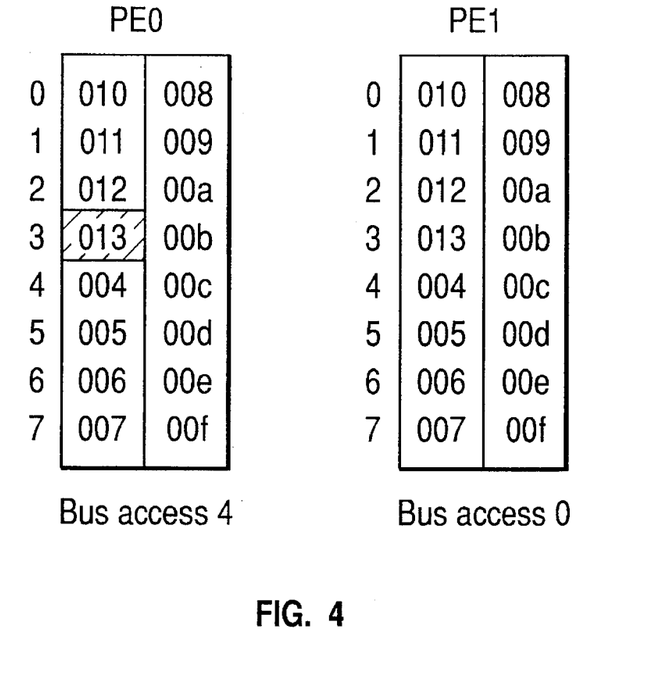
FIG. 4 is a table for explaining the operation of the present invention.

FIG. 4 indicates that PE0 reads addresses 000 to 013. At this time, PE1 has read addresses to 001. Data for addresses 000 to 003, which are cached, are replaced by data for addresses 010 to 013 based on PE0 access. PE1 has not yet been given access to data at addresses 002 and 003, which have been replaced in spite of the fact that data will be required in future. This phenomenon is called overrun.

Figure 5:
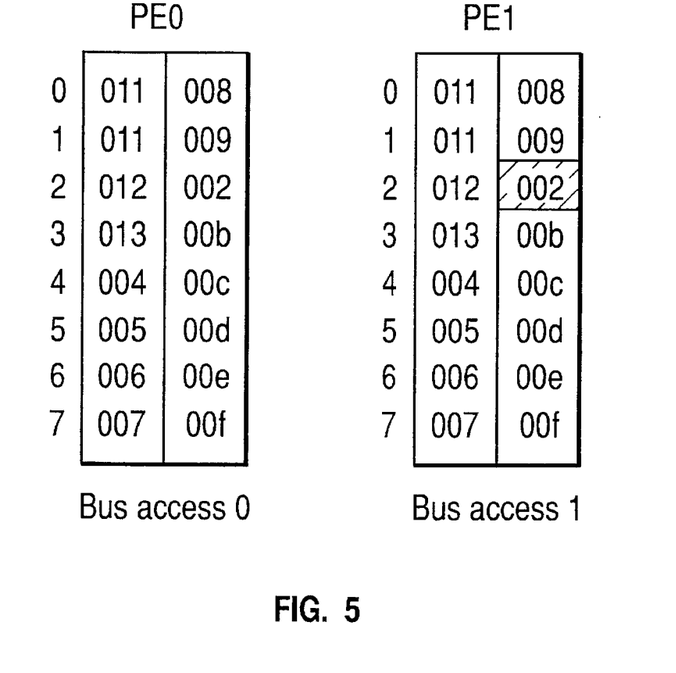
FIG. 5 is a table for explaining the operation of the present invention.
Figure 6:
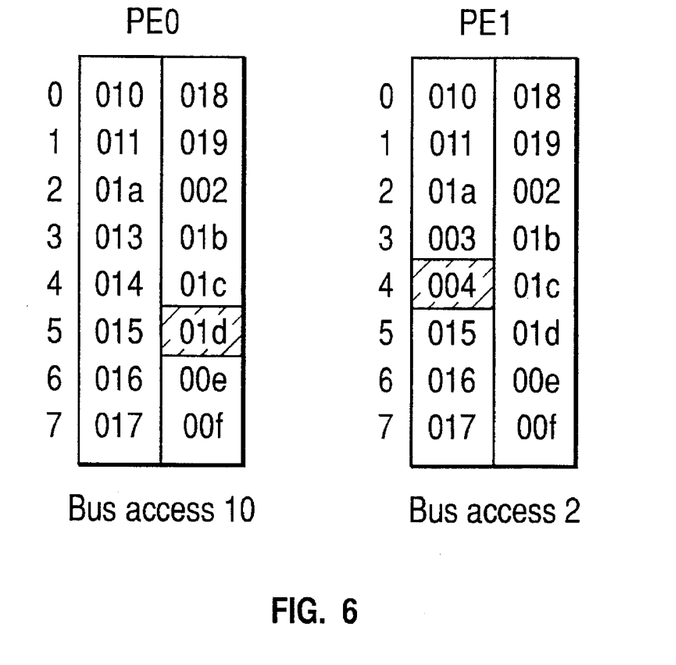
FIG. 6 is a table for explaining the operation of the present invention.
Figure 7:
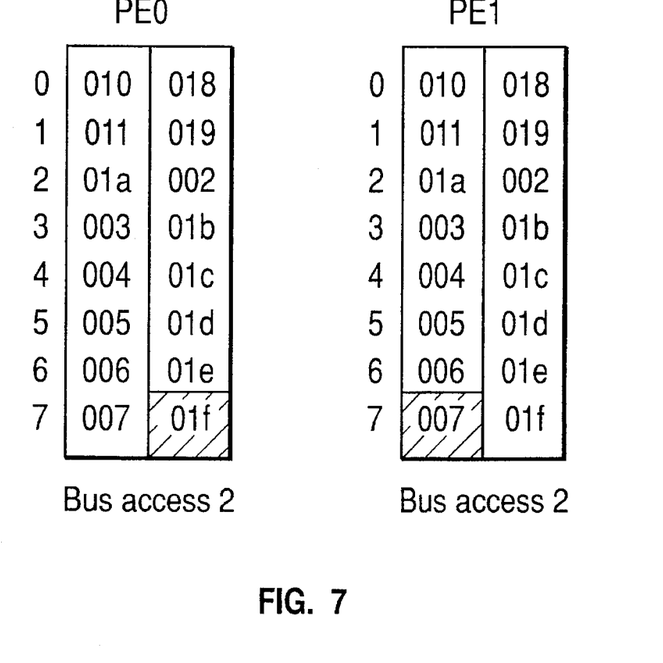
FIG. 7 is a table for explaining the operation of the present invention.
Figure 8:
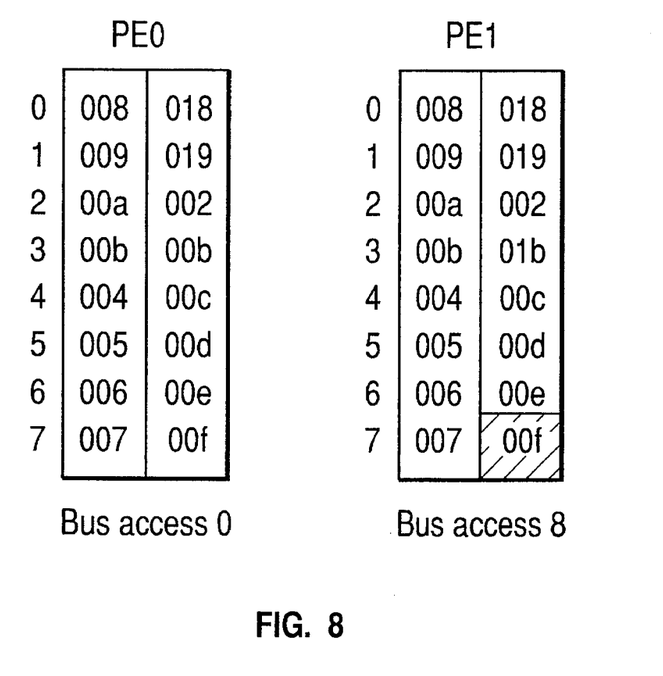
FIG. 8 is a table for explaining the operation of the present invention.
Figure 9:
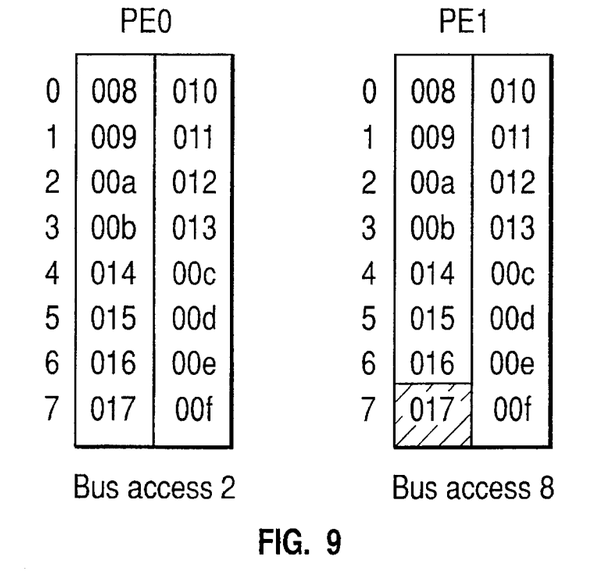
FIG. 9 is a table for explaining the operation of the present invention.

FIG. 5 shows the state where PE1 has read data for address 002. Also, at this time, PE1 sends data for address 00a which will be required hereafter and reads the contents of 002.

With reference to FIGS. 6, 7, 8, and 9, respective PEs read data for addresses up to 017, and the number of bus accesses is 32 times for PE0 and 30 times for PE1. This means that the required contents of the cache are overwritten by forced allocation of the all-read protocol because of overrun.

This phenomenon is liable to occur as the number of PEs increases. The allocation of data to other caches, due to the all-read protocol, always arises except in the case (dirty case) where a cache block corresponding to an access address must be written back before it is replaced.

A preferred embodiment of the present invention is described below with reference to the specified drawings.

Figure 10:
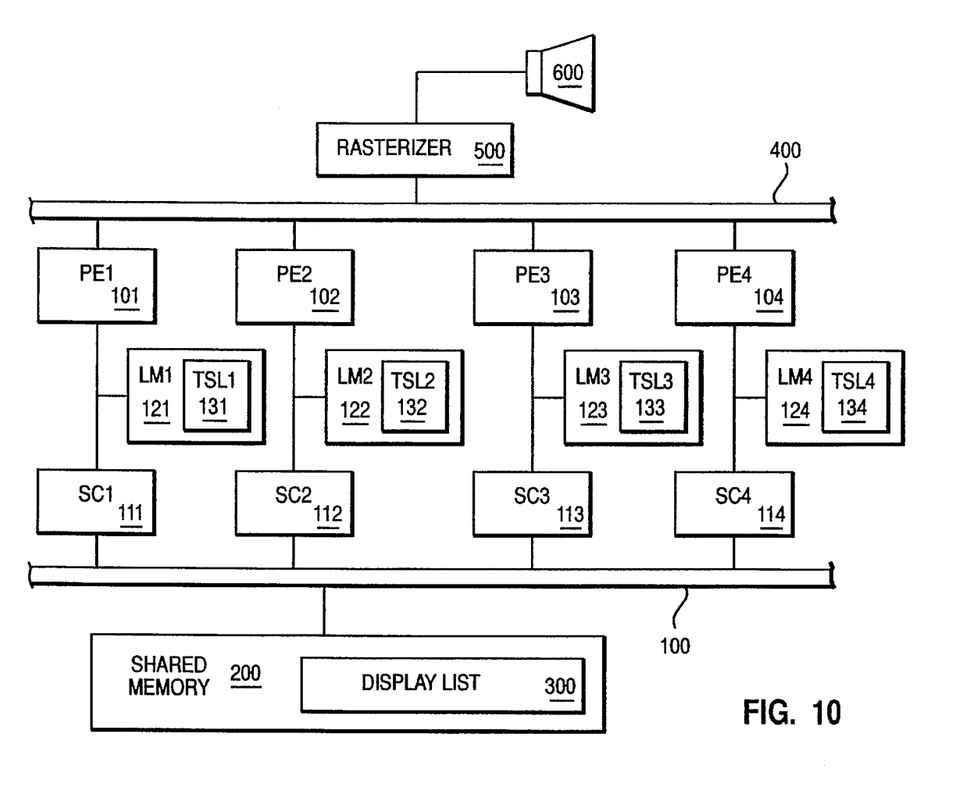
FIG. 10 is a block diagram showing the construction of an embodiment of the present invention.

FIG. 10 shows the entire construction of a system. In FIG. 10, a plurality of processing elements PE1, PE2, PE3, and PE4 (reference numerals 101, 102, 103 and 104, respectively) are connected to a shared bus 100 and shared memory 200 through private caches SC1 111, SC2 112, SC3 113, and SC4 114 (SC designates snoop cache). Controllers (FIG. 11) are located inside of the private caches 111, 112, 113 and 114 such that a signal on the shared bus 100 is monitored and the consistency of data is realized in accordance with a distributed control system. That is, in this system, the respective controllers, e.g. controller 240 of FIG. 11, all operate based on the protocol of the shared bus 100 so that the consistency of data is realized.

List control parts LMs 121, 122, 123, 124 are designed to control traverse state list buffers TSL 131, 132, 133, 134. Each PE 101, 102, 103, 104 reads a plotting indication instruction display list 300 stored in shared memory 200, executes processing, and then delivers data to a rasterizer 500 through a display bus 400. Reference numeral 600 designates a display device.

Figure 11:
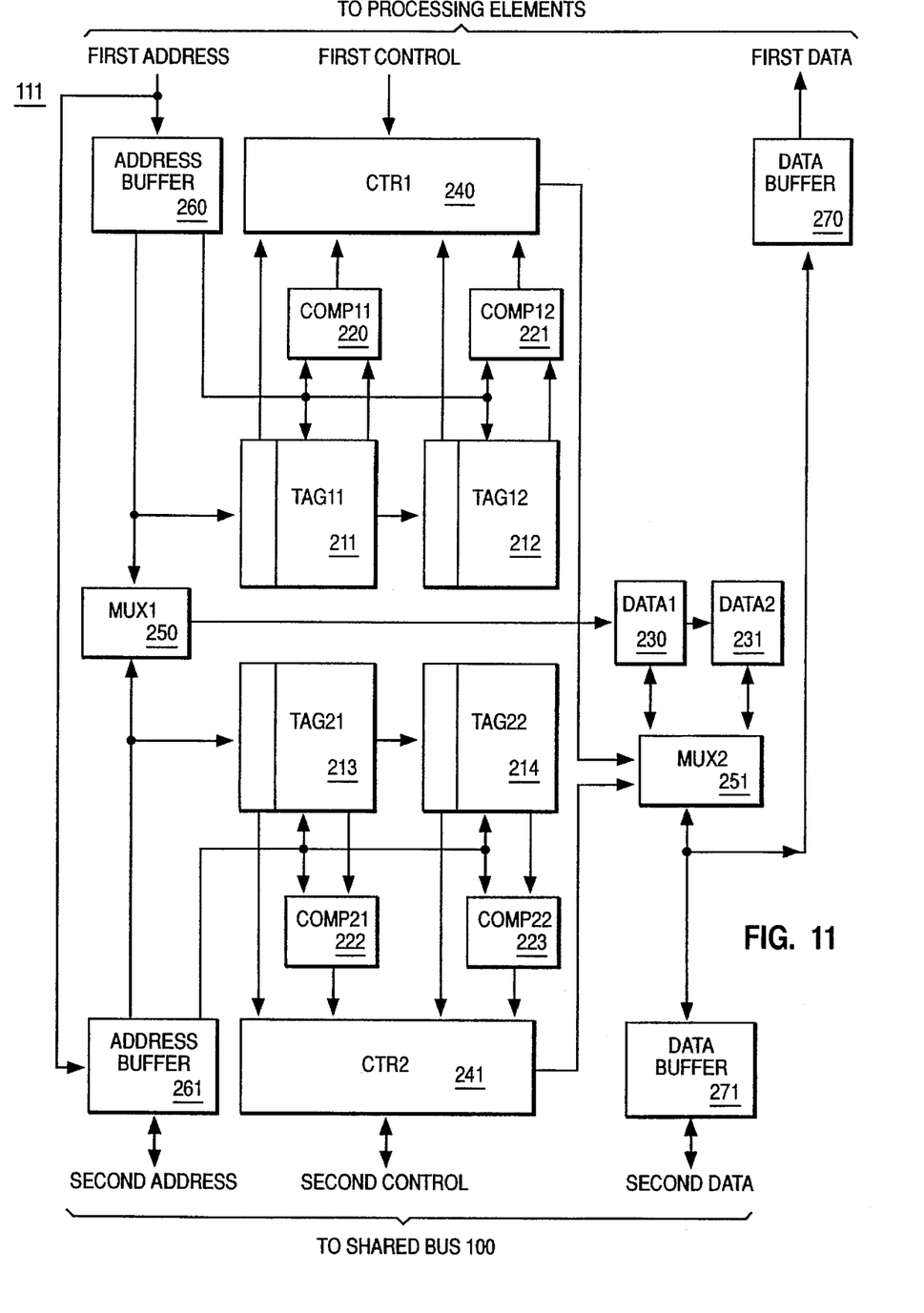
FIG. 11 is a block diagram showing the construction of main sections of the above embodiment.

FIG. 11 illustrates the construction of the private cache SC, such as cache 111. A first address line, a first control line, and a first data line are connected to one of the PEs, such as processing element 101. A second address line, a second control line, and a second data line are connected to the shared bus 100, and employed for access to the shared memory 200 by the PE, e.g. PE 101, and private cache SC 111, as well as for monitoring the signal on the bus 100 by private cache SC 111.

Tag memories Tag11 211, Tag12 212, Tag21 213 and Tag22 214, and address comparators Comp11 220, Comp12 221, Comp21 222, and Comp22 223 are duplexed for simultaneous access of control signals from the PE 101 and monitoring of the shared bus 100. Tag memories Tag11 and Tag21 hold an address and an attribute having the same contents with respect to data memory Data1 230. Tag memories Tag12 and Tag22 similarly hold an address and an attribute with respect to data memory Data2 231. Ctr1 240 and Ctr2 241 designate controllers and Mux1 250 and Mux2 251 designate multiplexers. Data buffer 271 transfers data between shared bus 100 and SC 111 to provide the data to (and receive data from) Mux2 251 and data buffer 270, which then provides the data to PE 101. Address buffer 261 transfers address information between bus 100 and SC 111 to provide the address to (and receive address information from) Mux1 and address buffer 260). The previous description was provided using PE 101 and private cache 111, however, it will apply with equal weight to processors 102, 103 and 104 in conjunction with private caches 112, 113 and 114.

Figure 12:
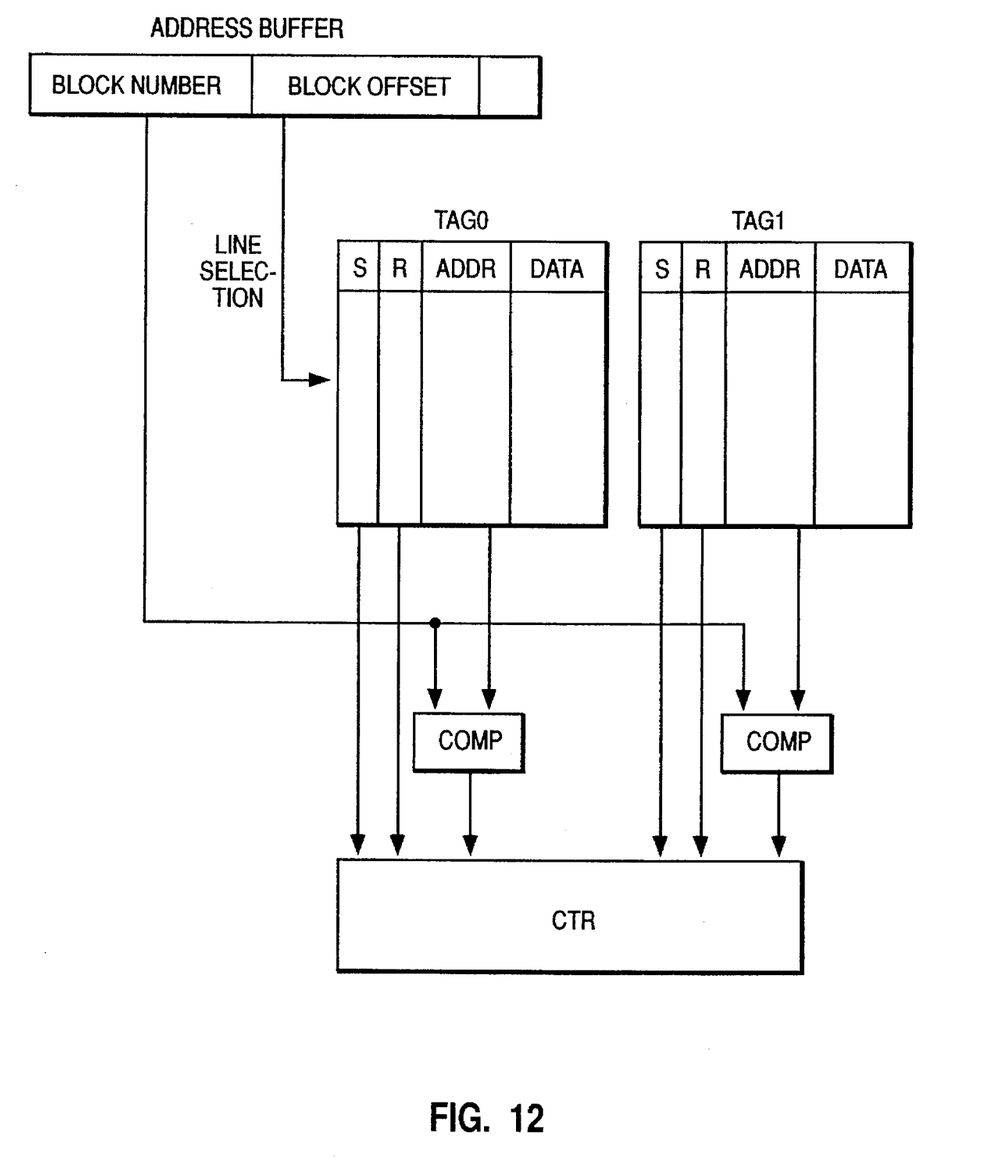
FIG. 12 is a view for explaining particular sections of the construction of the embodiment in FIG. 11.

Tags which are stored in the tag memories are shown in detail in FIG. 12. Tag0 of the tag memories is composed of a group of bits S and a bit R indicating a reference and part of memory addresses. The group of bits S is used to maintain the consistency of data between caches. This is specifically described in the Proceedings of the 13th International Symposium on Computer Architecture, (1986), 414–423, "A Class of Compatible Cache Consistency Protocols and Support by the IEEE Future Bus." The reference bit R is reset to (0) when data is read to the cache block and set to (1) when data is referred by the processing element.

In the present invention, when a certain processing element reads data from shared memory in the weak-all-read protocol, other processing elements perform processing as mentioned below as well as ordinary snoop cache processing.

When invalid cache blocks exist on cache lines, and one is selected, then weak-all-read data will be cached. At the same time, the state of the cache block shall be updated and the reference bit R will be reset to (0).

If invalid cache blocks do not exist on cache lines, and there are blocks in which the state of cache blocks is clean (data of the blocks has the same contents as that of shared memory) and the reference bit R is set to 1, one of them shall be selected and weak-all-read protocol data shall be cached. At the same time, the state of cache blocks shall be updated and the reference bit R shall be reset to 0.

In the access patterns shown in FIGS. 2 to 9, based on the weak-all-read protocol of the present invention, the number of bus accesses is 32 for PE0 and 16 for PE1. Accordingly, as compared with a case in which the all-read protocol is used (32 bus accesses for PE0 and 30 for PE1), the cache hit ratio is improved and the number of bus accesses (activity ratio) is decreased. In particular, the activity ratio of the bus may be the largest bottleneck in the shared bus multiprocessor. Therefore, a decrease in the number of bus accesses contributes significantly the improvement of performance thereof.

Although certain preferred embodiments have been shown and described, it should be understood that many changes and modifications can be made therein without departing from the scope of the appended claims.

We claim:

1. A multiprocessor graphic system for displaying graphical data, the multiprocessor graphic system comprising:

a shared memory for storing a plotting indication instruction display list;

a first shared bus for transmitting members of the instruction display list from the shared memory;

a first processor for requesting members of the instruction display list, and for processing the requested members;

a second processor for requesting members of the instruction display list, and for processing the requested members;

a first private cache, coupled to the first processor, having:
  means for receiving requests from the first processor for selected members of the instruction display list;
  means for storing members of the instruction display list, the storing means including:
    a tag memory including:
      a plurality of entries, each entry storing a single member of the instruction display list, and having a reference bit field for indicating whether the first processor has accessed the single stored member;
  means for retrieving the requested members of the first processor, and for storing the retrieved members in corresponding entries of the tag memory regardless of the indication of the reference bit of the entries;
  means for detecting, via the first shared bus, requests sent by the second processor for members of the instruction display list;
  means for retrieving the detected requested members of the second processor, and for storing the detected members in corresponding entries of the tag memory only when the reference bits of the corresponding entries indicate that the first processor has accessed their single stored entry;

a second private cache, coupled to the second processor, having:
  means for receiving requests from the second processor for selected members of the instruction display list;
  means for storing members of the instruction display list, the storing means including:
    a tag memory including:
      a plurality of entries, each entry storing a single member of the instruction display list, and having a reference bit field for indicating whether the second processor has accessed the single stored member;
  means for retrieving the requested members of the second processor, and for storing the retrieved members in corresponding entries of the tag memory regardless of the indication of the reference bit of the entries;
  means for detecting, via the first shared bus, requests sent by the second processor for members of the instruction display list;
  means for retrieving the detected requested members of the second processor, and for storing the detected members in corresponding entries of the tag memory only when the reference bits of the corresponding entries indicate that the second processor has accessed their single stored entry;

a second shared bus, coupled to the first and second processors, for receiving the processed members;

a rasterizer, coupled to the second shared bus, for controlling the displaying of the processed members; and a display device, coupled to the rasterizer, for displaying the processed members.

* * * * *